May 26, 1964  L. H. LIPPINCOTT ET AL  3,134,224
GAS BLEED FROM ROCKET CHAMBER
Filed May 26, 1961
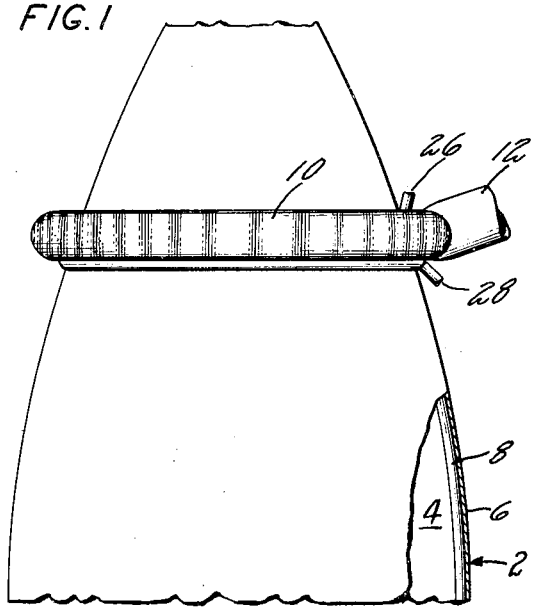
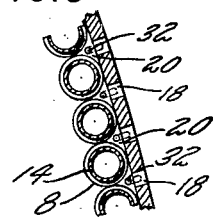
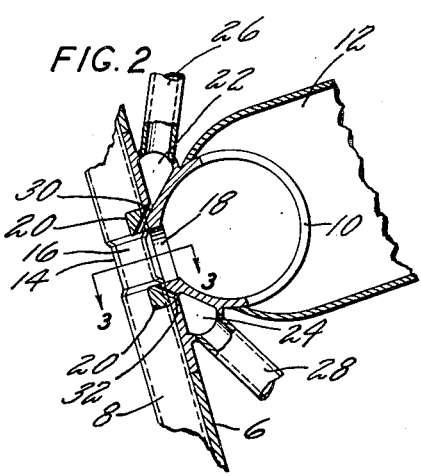
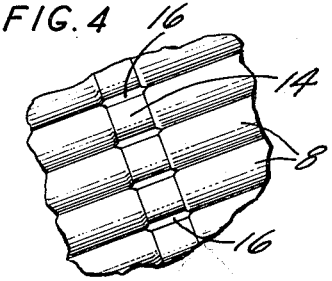
INVENTORS
LEANDER H. LIPPINCOTT
NELS R. NELSON
BY Charles A. Warren
ATTORNEY 3,134,224
GAS BLEED FROM ROCKET CHAMBER
Leander H. Lippincott, Middletown, and Nels R. Nelson, Manchester, Conn., assignors to United Aircraft Corporation, East Hartford, Conn., a corporation of Delaware
Filed May 26, 1961, Ser. No. 112,830
5 Claims. (Cl. 60—35.6)

This invention relates to an arrangement for bleeding gas under pressure from the chamber of a rocket to provide hot gas under pressure for other use such as for driving the turbopump for the propellant.

One feature of the invention is an arrangement by which to provide for bleeding a portion of the hot gas with a minimum of modification in the chamber construction. Another feature is an arrangement for cooling the gas being bled to a temperature which can be utilized. Another feature is an arrangement for bleeding the gas without interfering the flow of cooling fluid through the cooling passages provided in the chamber wall.

In certain rocket constructions the temperature of the gas in the rocket chamber is so high that it cannot be effectively utilized and cannot be ducted through conventional ducts. One feature of the invention is an arrangement for cooling the gas while it is being bled through the wall thereby reducing the gas to a usable temperature.

Other features and advantages will be apparent from the specification and claims, and from the accompanying drawing which illustrates an embodiment of the invention.

FIG. 1 is an elevation view through a rocket chamber showing the duct arrangement.

FIG. 2 is a fragmentary enlargement showing the device in greater detail.

FIG. 3 is a fragmentary sectional view substantially along the line 3—3 of FIG. 2.

FIG. 4 is a fragmentary elevation of the inside of the duct wall at the point where the gas is bled.

The invention is shown in connection with the wall 2 of a conventional rocket chamber 4 in which event the chamber 4 would be a combustion chamber. The chamber 4 may be a chamber used with a nuclear rocket in which no combustion takes place although the gas within the chamber 4 is extremely hot.

The chamber wall includes an outer shell 6 which constitutes a load-bearing shell. The shell 6 is of circular cross-section and is lined by a plurality of identical substantially parallel tubes 8 which are arranged in side-by-side contact with one another and in the arrangement shown extend axially of the chamber and from an inner wall of circular cross-section. These tubes are attached to the shell 6 as by brazing or welding and a coolant is circulated through these tubes when the rocket is in operation to prevent overheating of the tubes and to keep the wall 6 at a temperature which will permit adequate strength in the shell to withstand the pressures within the chamber.

In accordance with the invention, gas from within the chamber is vented to a hot gas manifold ring 10 which surrounds the chamber and which communicates with a duct 12 from which hot gas from the chamber is ducted to a point of use. To permit the escape of hot gas from the rocket chamber, adjacent tubes 8 are necked-down at a selected portion in radial alignment with the manifold 10, as indicated by the necked-down portions 14 of FIGS. 2 and 4. These necked-down portions define slots 16 between adjacent tubes.

The bleed passages or slots 16 are in alignment with axially extending slots 18 in the shell 6, these slots 18 also being in communication with the interior of the manifold 10, as shown. Suitable dams 20 are provided between the tubes and the surrounding wall 6 at opposite ends of the slots 18 to prevent escape of hot gas into the space between the tubes and the sourrounding shell.

The gas escaping through the passages 16 and slots 18 may be of such a high temperature that the material of the manifold 10 cannot withstand this temperature. To reduce the temperature of the gas the manifold incorporates integrally therewith cold gas manifold rings 22 and 24 which may be supplied through ducts 26 and 28 with cold gas from the same pump that supplies propellant to the chamber. Discharge passages 30 extend obliquely inward through the shell 6 and through the dam elements 20 from the manifold 22 to discharge cold gas into one end of each of the passages 16. Similar discharge passages 32 communicating with the manifold 24 provide for the discharge of the cold gas into the opposite end of each of the passages 16. By controlling the size of the passages 30 and 32, it is possible to obtain a resulting bleed gas temperature which will be hot enough for the purpose intended but sufficiently reduced in temperature so that it can be enclosed within and ducted by the manifold 10 and duct 12.

It will be apparent that by this arrangement the circulation of the coolant fluid through the tubes 8 is not materially affected so that these tubes will maintain their pressure vessel characteristics and their cooling characteristics with a minimum of wall thickness for the tubes and with a minimum of modification of the construction of the wall.

It is to be understood that the invention is not limited to the specific embodiment herein illustrated and described, but may be used in other ways without departure from its spirit as defined by the following claims.

We claim:

1. A rocket bleed construction including, a rocket wall of circular cross section and having a plurality of identical, substantially parallel coolant tubes in side-by-side contact extending longitudinally of said wall forming at least a part of the wall and enveloping the rocket chamber therewithin, each of said tubes having portions reduced in diameter to define hot gas bleed openings between adjacent tubes so that said openings extend circumferentially about said wall, said bleed openings communicating with said chamber and extending through said wall, a hot bleed gas ring manifold mounted on and extending around said wall and communicating with said bleed openings, means sealing between said tubes and said ring manifold, and cooling means for delivering a metered quantity of cold fluid into said bleed openings.

2. A construction as in claim 1 in which the wall also has a shell surrounding and supporting the tubes and in which said shell has slots thereon forming part of said bleed openings.

3. A construction as in claim 1 in which said cooling means includes a cold gas ring coolant manifold adjacent to the bleed manifold and coolant passages extending from said coolant manifold to said bleed openings.

4. Apparatus according to claim 2 and in which said sealing means includes circumferentially extending dams between said shell and said tubes on opposite sides of said openings and wherein said cooling means includes coolant passages extending through said shell and said dams.

5. Apparatus according to claim 1 wherein said cooling means includes two coolant ring manifolds located on opposite sides of said bleed ring manifold, and coolant passages connecting said coolant manifolds to said openings.

References Cited in the file of this patent

UNITED STATES PATENTS

| | | |
|---|---|---|
| 2,217,649 | Goddard | Oct. 8, 1940 |
| 2,242,491 | Van Brunt et al. | May 20, 1941 |
| 2,487,435 | Goddard | Nov. 8, 1949 |
| 2,523,010 | Goddard | Sept. 19, 1950 |
| 2,612,750 | Goddard | Oct. 7, 1952 |
| 2,977,754 | Bell | Apr. 4, 1961 |
| 3,093,963 | York et al. | June 18, 1963 |

FOREIGN PATENTS

| | | |
|---|---|---|
| 459,924 | Great Britain | Jan. 18, 1937 |